US009996237B2

(12) United States Patent
Van Dijkman et al.

(10) Patent No.: US 9,996,237 B2
(45) Date of Patent: Jun. 12, 2018

(54) METHOD AND SYSTEM FOR DISPLAY OF VISUAL INFORMATION

(71) Applicant: AGT International GmbH, Zurich (CH)

(72) Inventors: Eva-Maria Van Dijkman, Frankfurt (DE); Maria Paula Mariani, Frankfurt (DE); Elizabeth Parham, Frankfurt (DE)

(73) Assignee: AGT INTERNATIONAL GMBH, Zurich (CH)

( * ) Notice: Subject to any disclaimer, the term of this patent is extended or adjusted under 35 U.S.C. 154(b) by 239 days.

(21) Appl. No.: 14/709,513

(22) Filed: May 12, 2015

(65) Prior Publication Data

US 2015/0324107 A1    Nov. 12, 2015

Related U.S. Application Data

(60) Provisional application No. 62/045,384, filed on Sep. 3, 2014, provisional application No. 61/991,883, filed on May 12, 2014.

(51) Int. Cl.
*G06F 3/00* (2006.01)
*G06F 3/0484* (2013.01)
(Continued)

(52) U.S. Cl.
CPC ..... *G06F 3/04847* (2013.01); *G01C 21/3647* (2013.01); *G06F 3/0481* (2013.01);
(Continued)

(58) Field of Classification Search
CPC .............. G06F 3/04847; G06F 3/0481; G06F 3/04845; G06F 3/04883;
(Continued)

(56) References Cited

U.S. PATENT DOCUMENTS

2011/0199314 A1\*  8/2011  Laberge ................ G06F 3/0481
                                                         345/173
2013/0167094 A1\*  6/2013  Blumenberg ......... G06F 3/0488
                                                         715/863

FOREIGN PATENT DOCUMENTS

WO    WO 2008/001345          1/2008
WO    WO 2008001345 A2 *      1/2008    ............. H04N 5/232

OTHER PUBLICATIONS

International Search Report together with Written Opinion for PCT/EP2015/060528 dated Aug. 25, 2015.
(Continued)

*Primary Examiner* — Jeffrey A Gaffin
*Assistant Examiner* — Ayesha Huertas Torres
(74) *Attorney, Agent, or Firm* — Browdy and Neimark, PLLC

(57) ABSTRACT

A method for displaying a map location of a camera providing video information, the method comprising:
  causing presentation on a screen of a display device of a map of a monitored area indicating a determined number of acquisition devices located in the monitored area;
  receiving via an input device a command to display visual information acquired by the acquisition devices;
  causing the map on the screen to be partially replaced by a shutter comprising frames amounting to the determined number each of which present the visual information acquired by one of the acquisition devices;
  performing a gesture indicating a video frame containing the video information; and
  identifying a camera location on the map, wherein the camera location corresponds to the source of the video information.

8 Claims, 24 Drawing Sheets

(51) Int. Cl.
*G06F 3/0488* (2013.01)
*G11B 27/02* (2006.01)
*G11B 27/34* (2006.01)
*H04N 7/18* (2006.01)
*G06F 3/0481* (2013.01)
*H04N 5/232* (2006.01)
*H04N 5/247* (2006.01)
*G01C 21/36* (2006.01)
*G08B 13/196* (2006.01)

(52) U.S. Cl.
CPC ...... *G06F 3/04845* (2013.01); *G06F 3/04883* (2013.01); *G11B 27/02* (2013.01); *G11B 27/34* (2013.01); *H04N 5/23216* (2013.01); *H04N 5/247* (2013.01); *H04N 7/181* (2013.01); *G06F 2203/04806* (2013.01); *G08B 13/19682* (2013.01); *G08B 13/19693* (2013.01)

(58) Field of Classification Search
CPC ...... G06F 2203/04806; G01C 21/3647; H04N 5/23216; H04N 5/247; H04N 7/181; G11B 27/34; G11B 27/02; G08B 13/19693; G08B 13/19682
See application file for complete search history.

(56) References Cited

OTHER PUBLICATIONS

Robert T. Collins et al.: "Algorithms for Cooperative Multisensor Surveillance", Proceedings of the IEEE, IEEE, NY, USA, vol. 89, No. 10, Oct. 1, 2001, XP011044562, ISSN: 0018-9219, pp. 1456-1477.

* cited by examiner

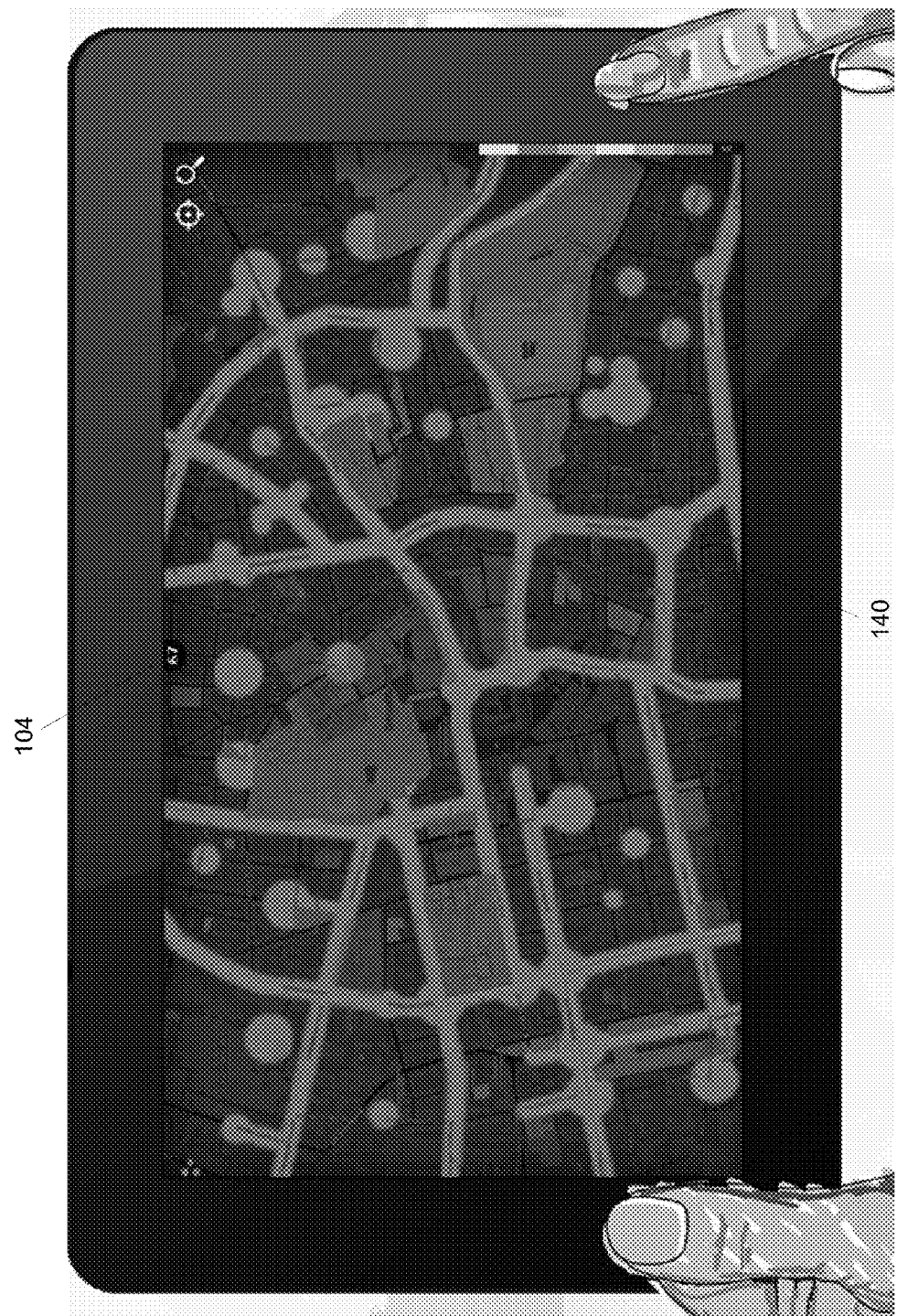

METHOD AND SYSTEM FOR DISPLAY OF VISUAL INFORMATION

CROSS REFERENCE TO RELATED APPLICATIONS

This application claims the benefit of U.S. Provisional Application No. 61/991,883 filed on May 12, 2014 and U.S. Provisional Application No. 62/045,384 filed on Sep. 3, 2014 which are hereby incorporated by reference in their entirety.

FIELD

The present invention generally relates to methods and systems for the presentation of raw and/or processed data. More specifically, the present invention relates to a method and system for display of visual information offering a multi-device solution with innovation in human-computer interaction and user experience.

BACKGROUND

As cities grow in size, number and complexity, city services become more and more stressed to their limits—and sometimes beyond these limits. In an increasingly global business environment, cities are competing harder than ever before to attract the investment, business and skilled labor that create employment, foster innovation and generate wealth. In order to maintain a safe and properly functioning community, the urban environment requires monitoring that is aimed at providing efficient and effective protection from crime and terrorism, maintaining safe, flowing traffic, and facilitate efficient and fast provision of various municipal services.

There are known urban monitoring systems. For example, many cities and municipalities maintain a network of cameras to monitor traffic and public spaces. Such systems typically rely on human operators who are located in the monitoring center, and watch live video feeds from various cameras presented to the operators on one or a plurality of screens. Detection of anomalies (e.g., traffic accidents, traffic congestion, hazardous traffic conditions, riots, criminal activities, etc.) is typically performed manually by the operators, who then direct forces (such as, for example, police or medical forces) to the scene of the detected anomaly or otherwise respond (e.g., changing the way traffic lights operate to prioritize the flow of traffic in a specific direction).

Recently a more sophisticated monitoring system was developed, which incorporates data gathered from various sensor networks, automatic processing to detect events of interest, and smart presentation of raw and processed information to one or a plurality of operators, so as to present a broader picture of the monitored zone.

SUMMARY

It is one object of the present invention to disclose a method for displaying a map location of a camera providing video information, the method comprising:
 causing presentation on a screen of a display device of a map of a monitored area indicating a determined number of acquisition devices located in the monitored area;
 receiving via an input device a command to display visual information acquired by the acquisition devices;
 causing the map on the screen to be partially replaced by a shutter comprising frames amounting to the determined number each of which present the visual information acquired by one of the acquisition devices;
 performing a gesture indicating a video frame containing the video information; and
 identifying a camera location on the map, wherein the camera location corresponds to the source of the video information.

It is another object of the present invention to disclose the method as defined above, further comprising:
 performing a gesture indicating a video frame containing the video information; and
 identifying a camera location on the map, wherein the camera location corresponds to the source of the video information.

It is another object of the present invention to disclose the method as defined above, wherein the gesture includes a tap and hold.

It is another object of the present invention to disclose the method as defined above, wherein the identifying the camera location on the map lasts for the duration of the hold.

It is another object of the present invention to disclose a method for zooming a map area to display video information captured by one or more cameras in the map area, the method comprising:
 causing presentation on a screen of a display device of a map area containing the one or more cameras;
 receiving user gesture to zoom the map area;
 causing the map area to be enlarged on the screen;
 causing video information from the one or more cameras to be displayed in frames adjacent to the enlarged map area, wherein each frame displays video information captured by a corresponding camera of the one or more cameras in the map area.

It is another object of the present invention to disclose the method as defined above, wherein each frame is adjacent to the corresponding camera of the one or more cameras in the map area.

It is another object of the present invention to disclose a method for removing a selected video frame from a video shutter, the method comprising:
 causing presentation on a screen of a display device of a map of a monitored area indicating a determined number of cameras located in the monitored area;
 receiving via an input device a command to display visual information acquired by the cameras;
 causing the map on the screen to be partially replaced by a shutter comprising frames amounting to the determined number each of which present the visual information acquired by one of the cameras;
 performing a gesture indicating a video frame containing the video information; and removing the video frame from the video shutter.

It is lastly an object of the present invention to disclose the method as defined above, wherein the gesture includes a drag.

BRIEF DESCRIPTION OF THE DRAWINGS

In order to better understand the present invention, and appreciate its practical applications, the following figures are provided and referenced hereafter. It should be noted that the figures are given as examples only and in no way limit the scope of the invention. Like components are denoted by like reference numerals.

FIG. 8 illustrates a display device displaying a screen with an urban map, highlighting parts of the visible portion of the urban map that are monitored by video cameras or other sensors, according to some embodiments of the present invention.

DETAILED DESCRIPTION

In the following detailed description, numerous specific details are set forth in order to provide a thorough understanding of the methods and systems. However, it will be understood by those skilled in the art that the present methods and systems may be practiced without these specific details. In other instances, well-known methods, procedures, and components have not been described in detail so as not to obscure the present methods and systems.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within memories, registers or other such information storage, transmission or display devices of the computing system. "Selecting", "inputting", "clicking", "identifying", "pointing", "dragging" and similar actions, are to be understood, unless specifically stated or understood otherwise, to be performed by operating an input device or input interface, such as a touch sensitive screen, keyboard, mouse, pointing device, scrolling ball, electronic pen, etc.

Some embodiments of the present invention are described herein with reference to urban control systems, by way of an example, without limiting generality. It is noted that the technology disclosed and claimed herein may be used in conjunction to any other types of information and content, and is not limited to urban control systems.

Figure 1:
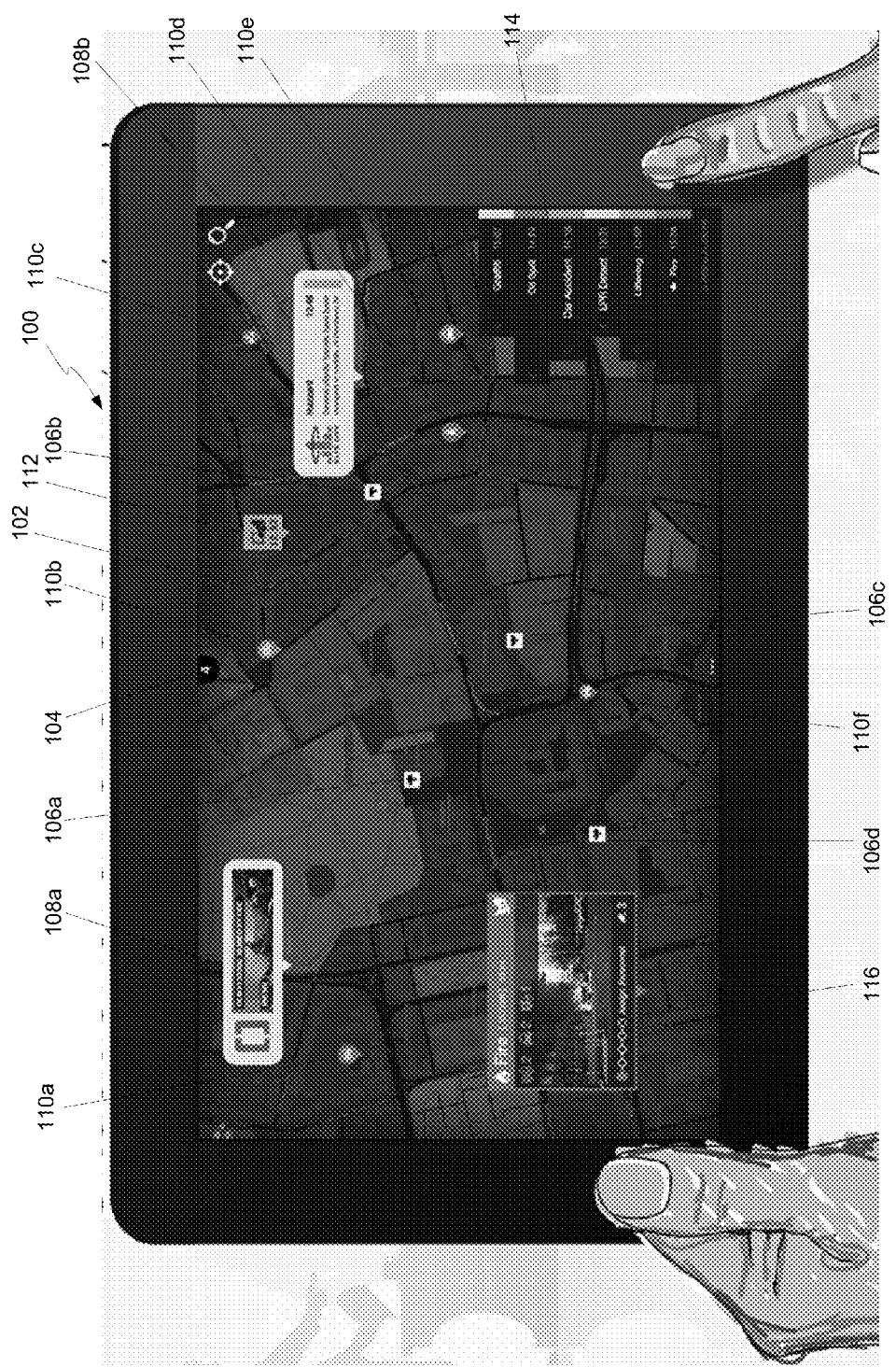
FIG. 1 illustrates a display device displaying a screen with a portion of an urban map and locations of video cameras, forces and events, of an urban monitoring application in that portion of the map, according to some embodiments of the present invention.

FIG. 1 illustrates a display device 100 displaying a screen with a portion of an urban map and locations of video cameras, forces and events, of an urban monitoring application in that portion of the map, according to some embodiments of the present invention.

Display device 100 may be, for example, a display of a personal computer, a TV screen, a screen of a laptop, a screen of a mobile handheld device, a tablet, a screen of a smartphone, etc.

The screen may be a touch sensitive screen on which various input actions and selections by a user may take place, or a screen coupled to a computing device with separate input device or devices, such as keyboard, mouse, pointing device, scrolling ball, electronic pen, etc. Presented on the screen of display device 100 is a visible portion of an urban map. On the visible portion of the urban map are shown various icons indicating the locations of video cameras 106a, 106b, 106c and 106d, location specific event information such as information windows 108a and 108b (e.g., input collected from social media about events occurring in the city. Events may also be added by an operator, forces and other sensors and sources. Each format may be represented in a unique form or style to enable the user to easily process the information), symbol of a traffic accident 112 and image 116, icons symbolizing various forces deployed in the visible portion of the urban map, such as fire track 110a, ambulance 110b, motorcycled police officer 110c, police officer on foot patrol 110d, police cars 110e and 110f, and a deployable menu for selecting specific event types. Selecting a specific event type may cause a frame of an image, video or other graphical or textual information to appear at or near locations on the visible portion of the urban map where these events had occurred. A video camera counter 104 is presented on the screen. Video camera counter 104 typically indicates the number of video cameras that are located in the area covered by the visible portion of the map presented on the screen (4 in the example shown in this figure). In some instances the video cameras located in the area covered by the visible portion of the map are actually indicated by specific icons on the portion of the map shown on the screen. In some other embodiments only some or none of the video cameras that are located in the area covered by the visible portion of the map are indicated by specific icons on the portion of the map shown on the screen. In some embodiments of the present invention the number indicated on the video camera counter indicates the number of selected video cameras.

In some embodiments of the present invention, the video camera counter is located at an edge of the screen (in the example shown in the figures video camera counter 104 is located at the center top of the screen).

Figure 2:
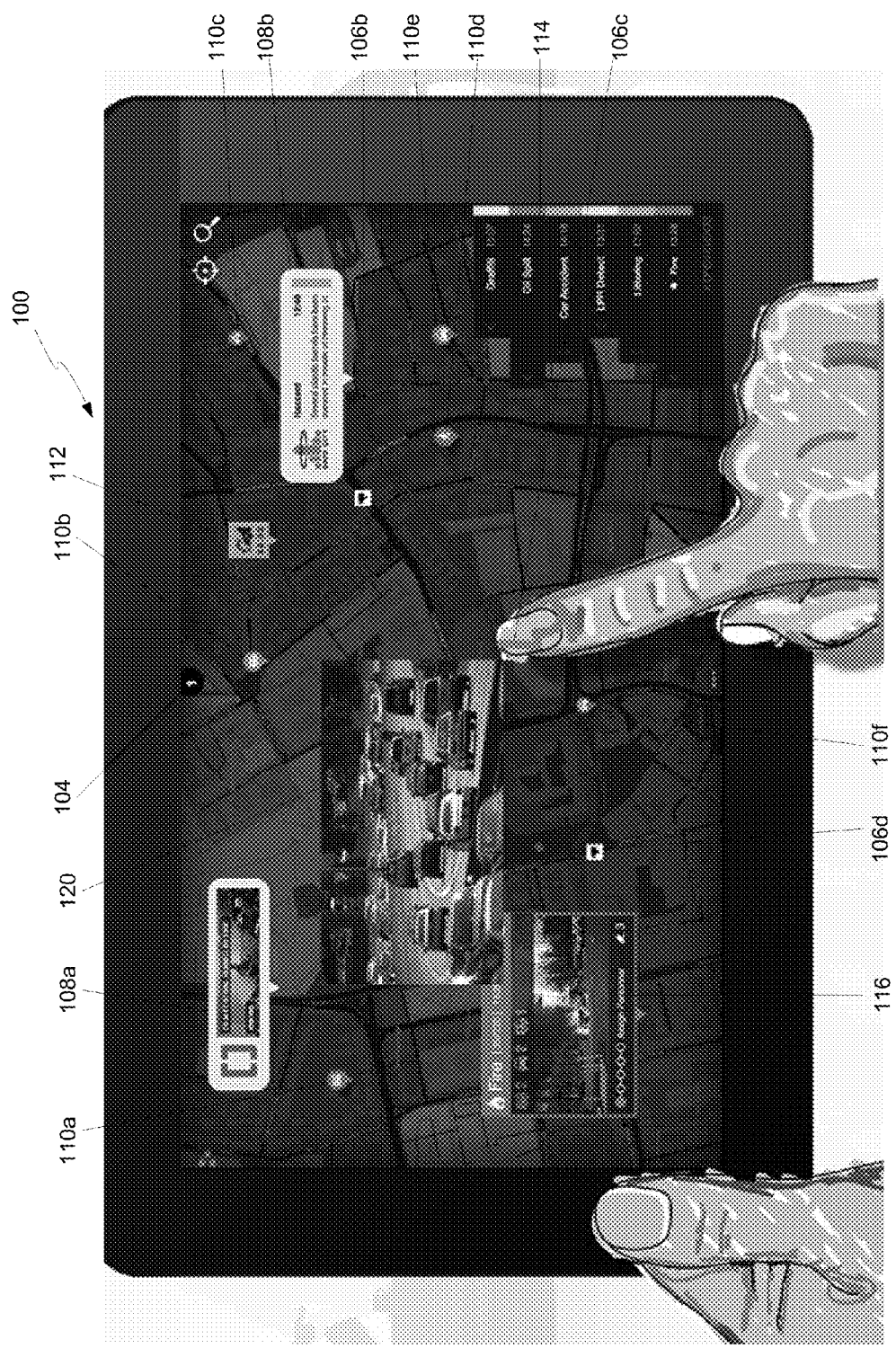
FIG. 2 illustrates a display device displaying the screen shown in FIG. 1, displaying a frame presenting video feed from a selected camera in the displayed portion of the urban map, according to some embodiments of the present invention.

FIG. 2 illustrates a display device 100 displaying the screen shown in FIG. 1, displaying a frame 120 presenting video feed from a selected camera 106c in the displayed portion of the urban map, according to some embodiments of the present invention. Video camera counter 104 indicates now "1" relating to the selected camera 106c. The camera may be selected by the user by clicking or touching or otherwise selecting the camera upon which the video feed of that camera will be presented. On click of a camera icon, the video will open and play (and stay open). On touch hold, the video will open and play, but on release of the touch hold the video will disappear. The camera may further be deselected to stop the video feed from being presented. Deselecting may be performed in the same manner as selecting or in another way.

Figure 3:
FIG. 3 illustrates a display device displaying the screen shown in FIG. 1, displaying an event pile with currently open events in a monitored urban are: When selecting an event a frame presenting visual information relating to that event of a selected event type that has occurred at a location on the urban map is presented, according to some embodiments of the present invention. As used herein, the term "visual" includes video, graphical or information of other visual content.

FIG. 3 illustrates a display device displaying the screen shown in FIG. 1, displaying an event-pile (stack) with all open events. One of the events is selected by clicking on one row of the pile, frame 122 presenting visual information relating to an event—in this example a littering event—that has occurred on the urban map, of a selected event type, according to some embodiments of the present invention. This may be caused by selecting "littering" event type on the event type menu 114. Note that frame 116 (see FIG. 1) is now substituted by icon 116, as it relates to "fire" events and not to "littering" events. Video camera counter 104 indicates "4", as four cameras are located in the visible portion of the urban map.

In some embodiments the user may swipe down on the event frame (FIG. 2, frame 116) to reduce it to a minimized version (FIG. 3, icon 116). From the minimized version (FIG. 3, 116) swiping the icon up would convert to the full event frame (FIG. 2, frame 116). In some embodiments such actions may also apply to frames (e.g., social network events and any other type of event that appears over the map).

Figure 4:
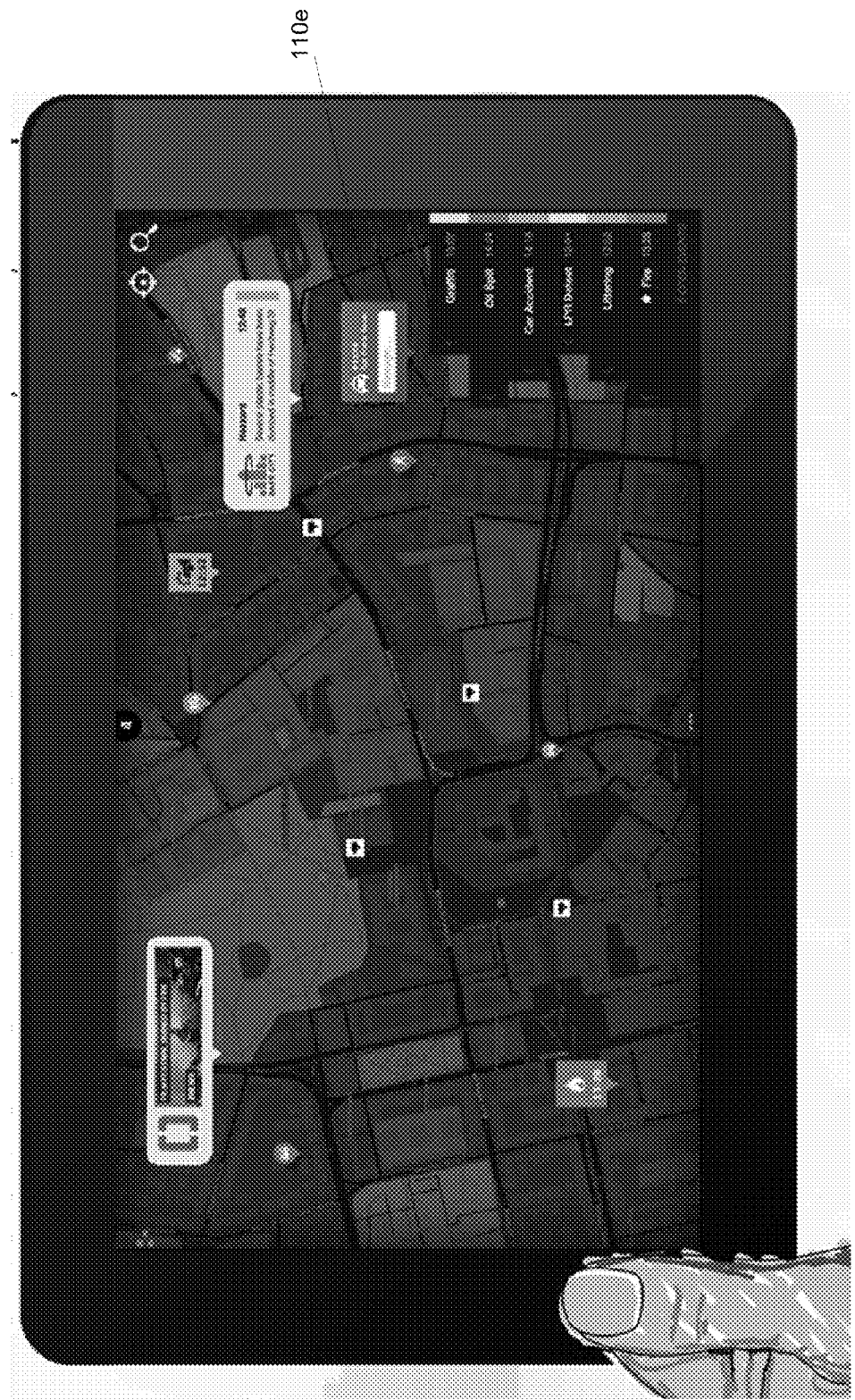
FIG. 4 illustrates a display device displaying the screen shown in FIG. 1, displaying a frame presenting information of a selected member of the forces located in the displayed portion of the urban map and facilitating a chat with the selected member of the forces, according to some embodiments of the present invention.

FIG. 4 illustrates a display device displaying the screen shown in FIG. 1, displaying a frame presenting information of a selected member of the forces located in the displayed portion of the urban map, according to some embodiments of the present invention.

When selecting icon 110e (see FIG. 1), for example by clicking on that icon, an information frame appears, presenting information on the force member indicated by the icon. In the example shown the police officer in charge in the police car is named and a message line is opened, allowing communication (e.g., SMS or other messenger communication) to be established to and from that police officer.

Figure 5A:
FIG. 5A illustrates a display device displaying pulling down a shutter that includes video frames presenting video feed from cameras present in the displayed portion of the urban map, according to some embodiments of the present invention.

FIG. 5A illustrates a display device displaying pulling down a shutter 113 that includes video frames 124a and 124b playing video feed from cameras present in the displayed portion of the urban map, according to some embodiments of the present invention. A user may place a finger over video camera counter 104 (that was initially on top of the screen), and pull it down, causing shutter 113 to appear. In some embodiments various actions may be performed in the video camera counter 104, such as, for example:

1) on click it goes totally down (presenting full video screen)

2) on touch drag, it stops at the vertical location when the finger was released. According to some embodiments of the invention, the video frames may reorganize their arrangement on the shutter according to the area the shutter takes up of the visible screen. Reorganization of the frames (or tiles) may be performed dynamically and continuously while the video shutter is moved down. The video frames may reorganize in a way that all cams have the optimum visibility for the specific visible area at any given time.

Figure 5B:
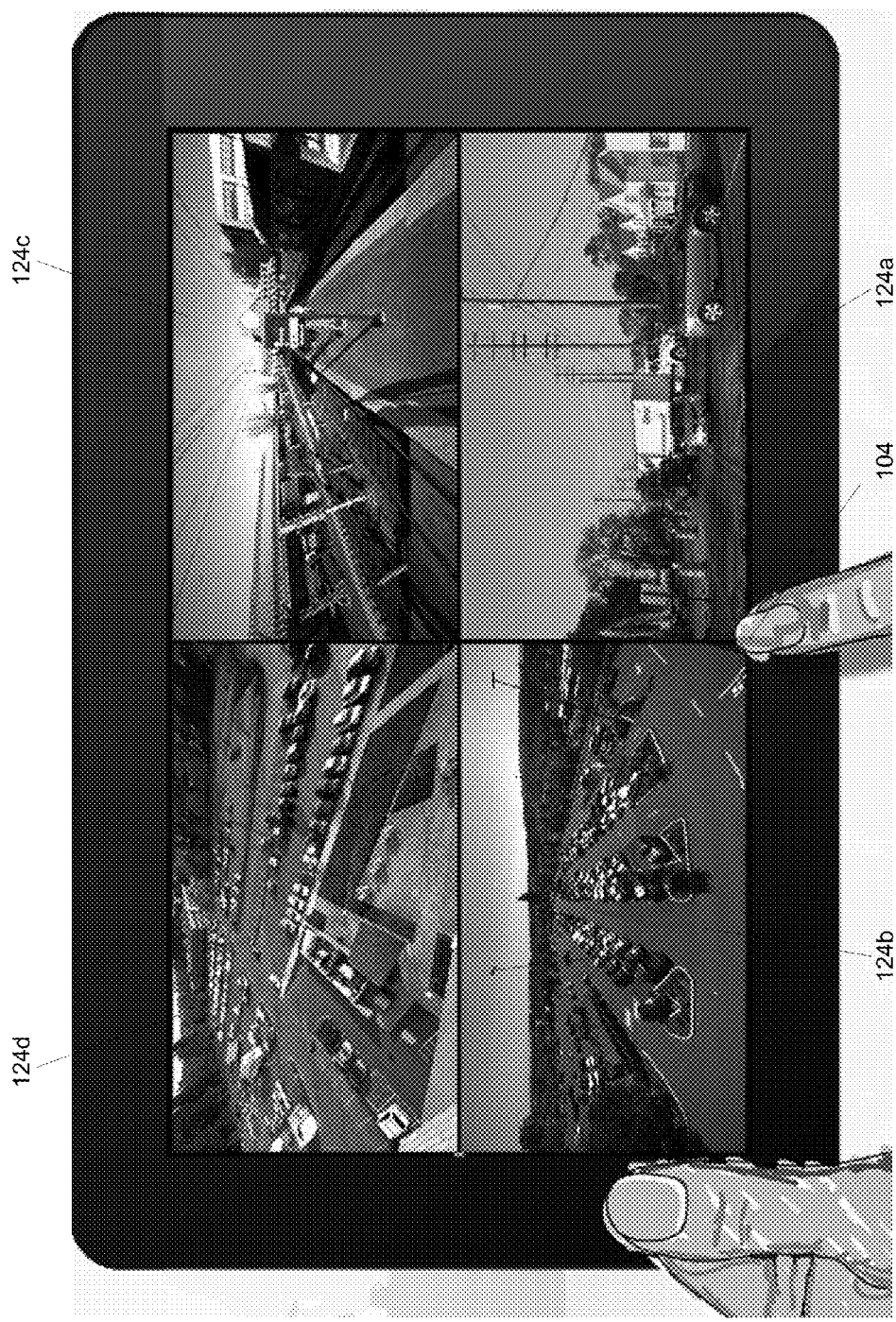
FIG. 5B illustrates a display device displaying a shutter that includes video frames presenting video feed from the cameras present in the previously displayed portion of the urban map (seen on the screen shown in FIG. 5A), according to some embodiments of the present invention.

FIG. 5B illustrates a display device displaying the shutter 113 that includes video frames presenting video feed from the cameras present in the previously displayed portion of the urban map (seen on the screen shown in FIG. 5A), according to some embodiments of the present invention. Video frames 124a, 124b, 124c and 124d present video feeds from video cameras 106a, 106b, 106c and 106d, respectively. As there were four video cameras in the visible portion of the map (as originally indicated by video camera counter 104 (see FIG. 4), four video frames—124a, 124b, 124c and 124d—appear on shutter 113.

Figure 6A:
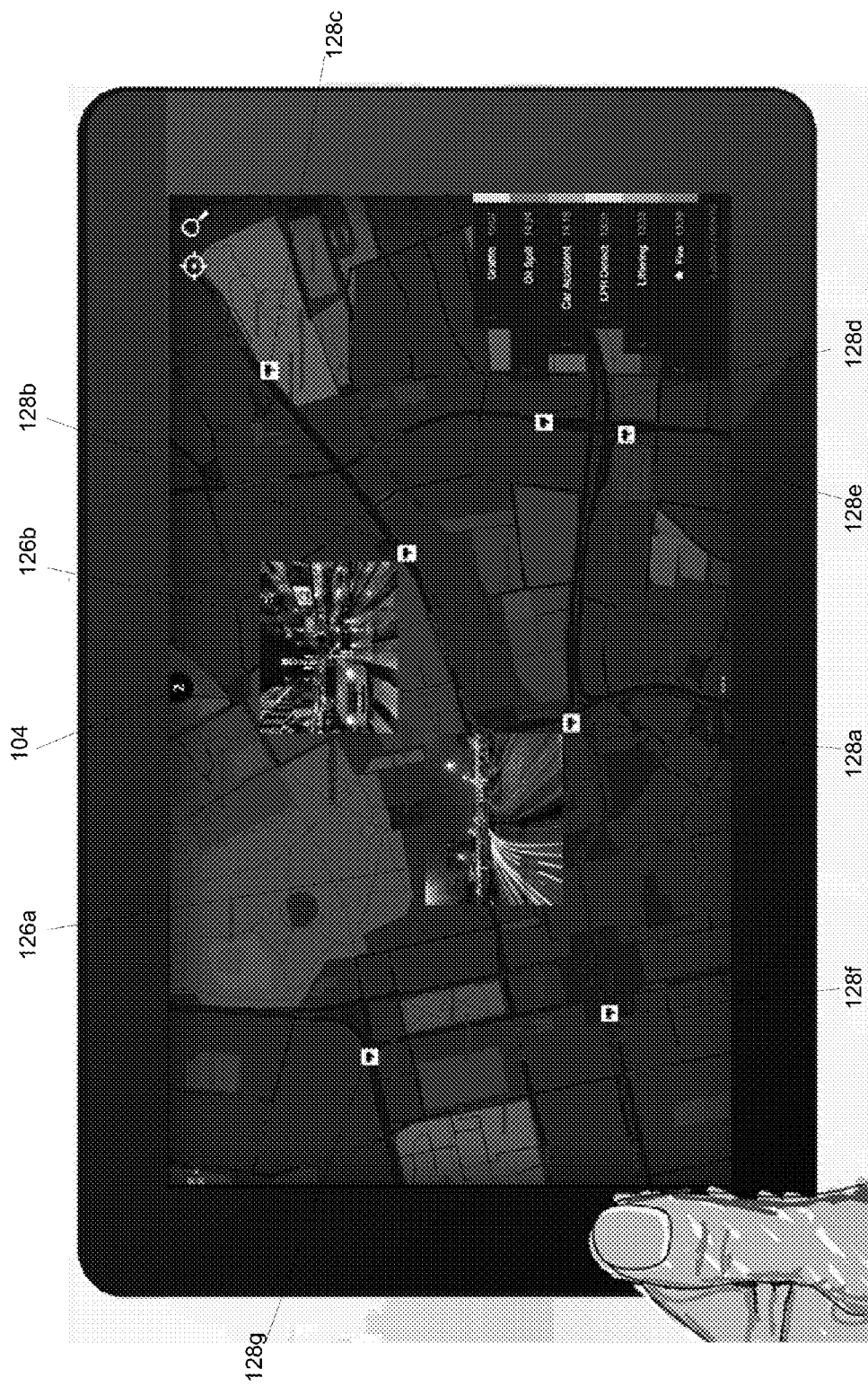
FIG. 6A illustrates a display device displaying the screen shown in FIG. 1, displaying two frames presenting video feed from two selected cameras on the displayed portion of the urban map, according to some embodiments of the present invention.

FIG. 6A illustrates a display device displaying the screen shown in FIG. 1, displaying two frames 126a and 126b presenting video feed from two selected cameras 128a and 128b respectively, on the displayed portion of the urban map, according to some embodiments of the present invention. Selecting the video cameras for which it is desired to watch their video feeds may include clicking on, touching the respective icons of the cameras, or otherwise selecting these cameras.

Figure 6B:
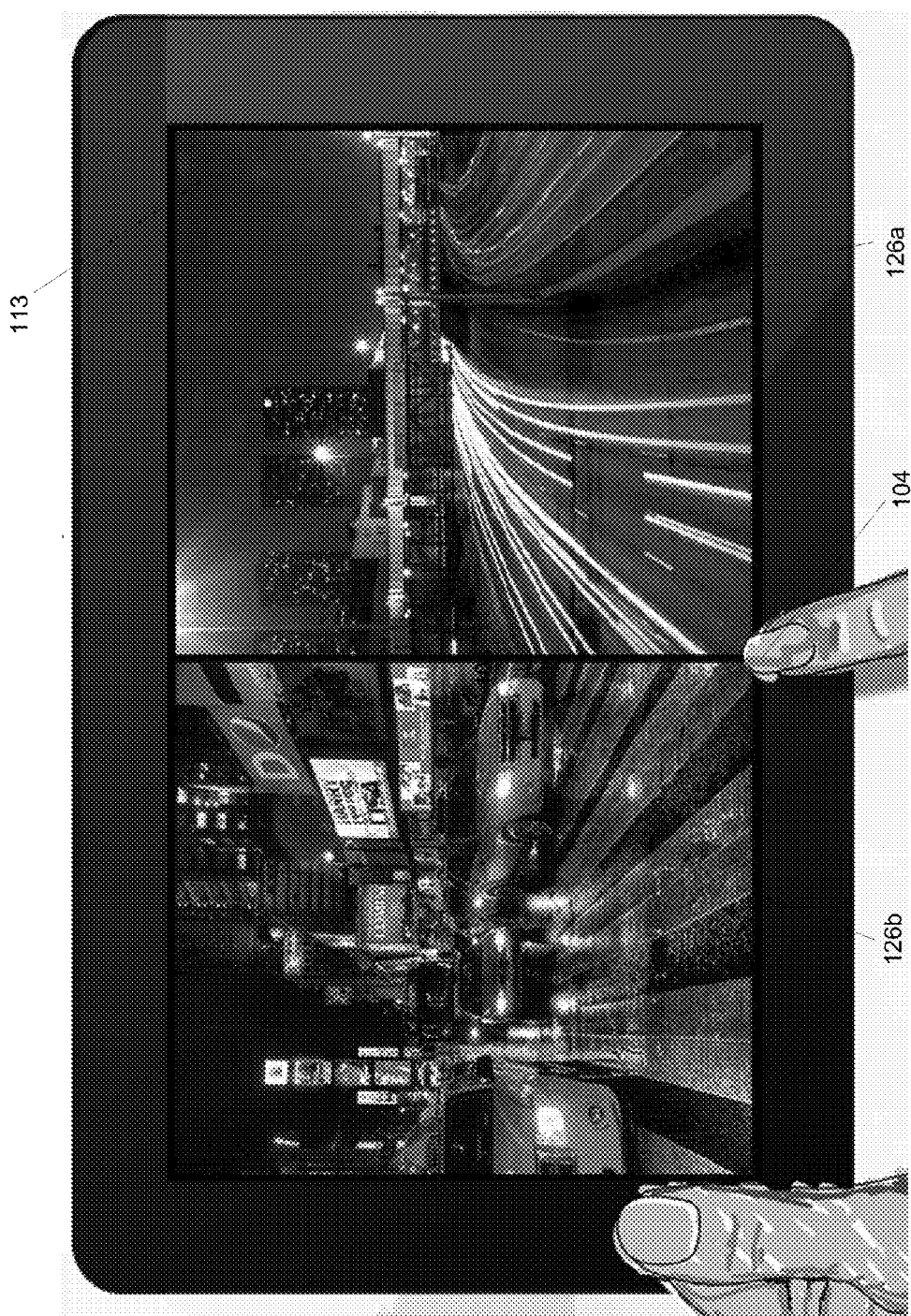
FIG. 6B illustrates a display device displaying a shutter that includes video frames presenting video feed from the cameras that were previously selected (see the screen shown in FIG. 6A), according to some embodiments of the present invention.

FIG. 6B illustrates a display device displaying the shutter 113 that includes video frames presenting video feed from the cameras that were previously selected (see the screen shown in FIG. 6A), according to some embodiments of the present invention. When activating shutter 113, only two frames of video feeds presented, since only two cameras were selected in the previous screen (FIG. 6A).

Figure 7A:
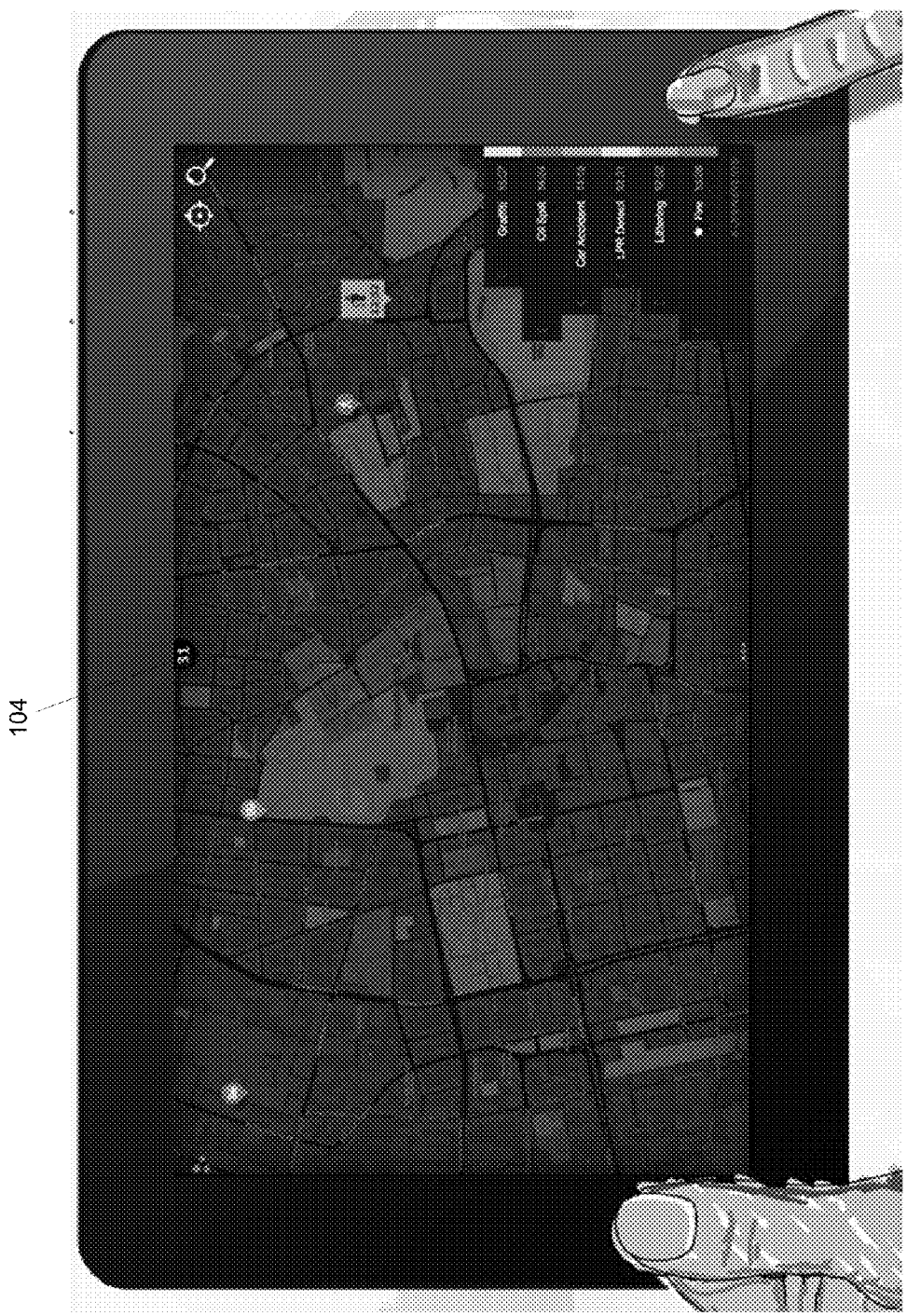
FIG. 7A illustrates a display device displaying a screen with a zoomed out urban map that includes a large number of video cameras, forces and events, in the displayed portion of the urban map, according to some embodiments of the present invention.

FIG. 7A illustrates a display device displaying a screen with an urban map that includes a large number of video cameras, forces and events, in the displayed portion of the urban map, according to some embodiments of the present invention. Video camera counter 104 indicates in this example the presence of 31 video cameras in the area represented by the visible portion of the urban map. Since this is a large number, including icons representing those cameras on the map may be too distracting, so according to some embodiments of the present invention, above a predetermined number of video cameras—a threshold—per a specified area presented on screen, the icons for those cameras will not be presented on screen. Finding those cameras may require zooming into the map so as to present an area in which the number of present video cameras is below the threshold would cause icons representing the cameras to appear on screen. Other icons representing other entities, such as, for example, forces and/or events, may still appear on the visible portion of the map. Flashlight view can be used to display the areas covered by cameras.

Figure 7B:
FIG. 7B illustrates a display device displaying an enhanced graphical presentation—two-dimensional (2D) and three-dimensional (3D)—of a selected zone of the displayed portion of the urban map, according to some embodiments of the present invention.

FIG. 7B illustrates a display device displaying an enhanced graphical presentation of a selected zone of the displayed portion of the urban map, according to some embodiments of the present invention. The user may select a location on the visible portion of the map, for example, by touching that location, clicking on it, or otherwise selecting it. When selected, an enlarged view 132 of the sector of the map that includes the selected location, may be presented on the screen. The view may include three dimensional renderings 133 of buildings and monuments that are present in that sector, and icons 134a and 134b indicating video cameras that exist in that sector, and their respective direction and field of view 136a and 136b. Frames 138a and 138b containing video feeds from these cameras may be also presented. In some embodiments the frames of video feeds would automatically pop up, whereas in other embodiments, the user would have to select a camera in order to cause the frame of video feed from that camera to appear on screen. Video camera counter 104 indicates "2", as only two cameras are present in the selected sector. When pulling the video shutter down, it will display the two cameras of the selected sector on the video shutter.

FIG. 8 illustrates a display device displaying a screen with an urban map, highlighting parts 140 of the visible portion of the urban map that are monitored by video cameras or other sensors, according to some embodiments of the present invention. This is in particular suitable for portions of the urban map that cover a large area of many cameras. The user may first select a certain zone by zooming into the map and once the number of video cameras within the visible portion of the map is below a predetermined threshold, the exact locations of the cameras would be revealed to the user, the icons representing these cameras appearing on the screen. According to some embodiments of the invention FIG. 8 illustrates a minimized version of an event-pile. Colors may represent the level of importance of the event (high, medium or low). If the user taps on one of the areas, a preview of the event may be presented. If the user taps on the number of open events that appears at the bottom of the list ("6" in the example of this figure), a view of all the events may be presented.

Figure 9A:
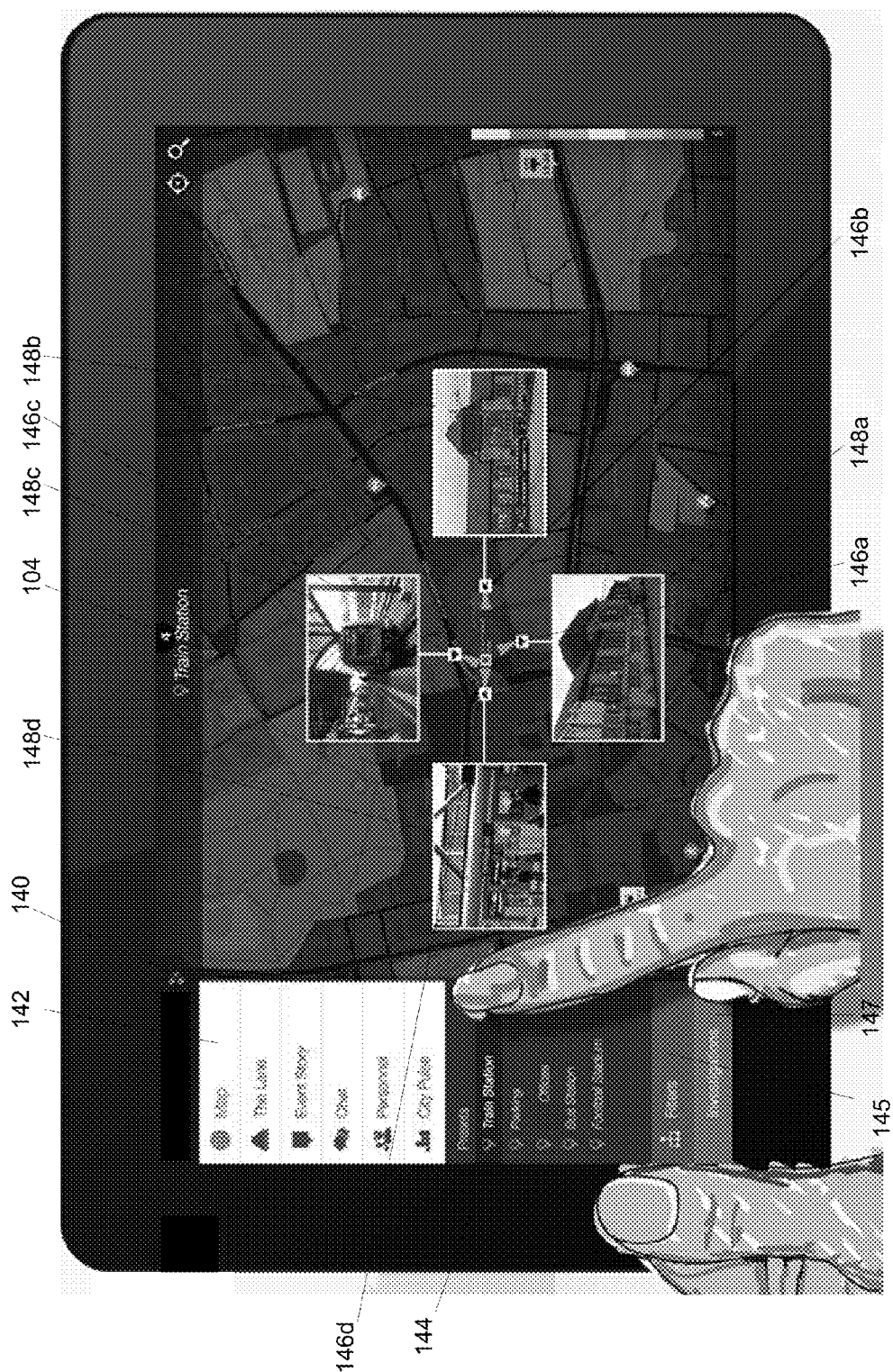
FIG. 9A illustrates a display device displaying a screen with an urban map, presenting a plurality of frames showing video feed from a preselected group of cameras, according to some embodiments of the present invention.

FIG. 9A illustrates a display device displaying a screen with an urban map, presenting a plurality of frames showing video feed from a preselected group of cameras, according to some embodiments of the present invention. A user may customize the display by defining preset scenarios in which the locations of specific cameras would be presented on the map, with their video feeds presented in frames on the screen. A preset may be defined by features, such as, for example: a map area, a map-zoom level, a selection of cameras, a name. If one of the cameras is a PTZ (pan-tilt-zoom) the zoom level and direction of the PTZ is also part of the preset. In this example present scenarios are listed on menu 142 (which may be called to appear on the screen by clicking or dragging icon 140). In the example shown in this figure the user has defined the following preset scenarios that are listed on menu 142: "Train station", "Parking", "Office", "Bus station" and "football stadium". In the example shown the preset scenario "train station" 144 is selected, causing the icons 146a, 146b, 146c and 146d representing the video cameras that have the train station or part of it within their field of view, and their corresponding fields of view, to appear on the visible portion of the map on the screen. Frames 148a, 148b, 148c and 148d, presenting video feed from these cameras may also appear on screen.

Menu 142 may also include additional offered selections, such as, for example, "Filters" 145 and "Investigations" 147, for which explanation is provided hereinafter.

Figure 9C:
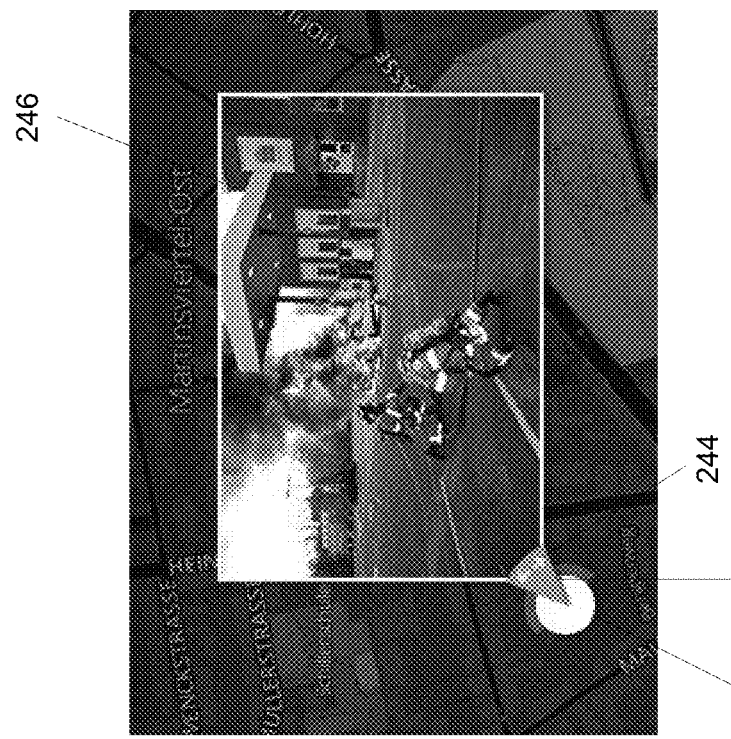
FIG. 9C illustrates an excerpt of a map shown on a screen of a display device, according to some embodiments of the present invention, in which the video camera identified by icon 240 is selected and video feed from that camera is displayed.
Figure 9B:
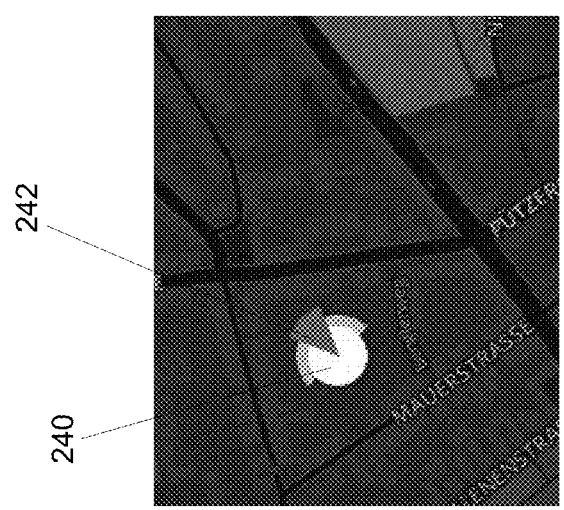
FIG. 9B illustrates an excerpt of a map shown on a screen of a display device, according to some embodiments of the present invention, which includes in icon 240 of a video camera on a location on the map that corresponds to a video camera positioned in a corresponding location in an urban area monitored.

FIG. 9B illustrates an excerpt of a map shown on a screen of a display device, according to some embodiments of the present invention, which includes in icon 240 of a video camera on a location on the map that corresponds to a video camera positioned in a corresponding location in an urban area monitored. The video camera icon includes a funnel shaped portion 242 that represents the direction of the field of view of the camera on the actual location. Thus the user is able to realize the direction of the view seen by that camera just by glancing at the screen, without having to actually actuate the video feed frame, and decide instantly whether to view the video content of that camera or select another. In order to distinguish between cameras of different types (e.g., pan-tilt-zoom, face recognition, fixed camera, license plate recognition) the icon for each type of video camera may be designed uniquely different from other types (e.g., different colors, different shape, etc.) so that the user would be able to quickly figure out the type of the camera a particular video camera icon represents. In some embodiments of the invention an index of the different icons used to identify each camera type may be provided on the display screen. The video camera icon is designed in a way, so that it may be used for indicating cameras having fields of view directed in different directions, simply by rotating the same icon.

FIG. 9C illustrates an excerpt of a map shown on a screen of a display device, according to some embodiments of the present invention, in which the video camera identified by icon 240 is selected. When a user selects that icon, the icon may alter, to clearly indicate it was selected (e.g., by a change in the color of the icon, or by another graphical change). Selection of the video camera icon 240 causes a video feed frame 146 to open up on the screen, playing video from that camera. The video feed frame may be placed such that it is adjacent to and extending from the direction indicating funnel 242, to intuitively relate to that camera. In the case of a pan-tilt-zoom camera, an indication 244 of the ability to pan, tilt or zoom that camera may be presented. If such camera is being used by another user, indication 211 would not appear, as that camera may only be manipulated by one user at a time. The video camera icon is designed in a way, so that it may be used for indicating cameras having fields of view directed in different directions, simply by rotating the same icon.

Figure 10:
FIG. 10 illustrates a display device displaying a screen presenting filtering parameters for choice, according to some embodiments of the present invention.

FIG. 10 illustrates a display device displaying a screen presenting filtering parameters for choice, according to some embodiments of the present invention. This screen may be presented as a result of the user's selection of "Filtering" 145 (see FIG. 9A).

The "Filtering" screen may include several sections, for example: "Events" section 150a for selecting filtering parameters relating to events, "Personnel" section 150b for selecting filtering parameters relating to personnel (e.g., available forces and backup forces), and "Map" section 150c, for selecting filtering parameters relating to the presentation of information on the map. Other personalization options may be available such as social media, sources, etc.

"Events" section 150a may include filtering parameters such as, for example, security level 152a (e.g., "Low", "Medium" and "High"), source 152b for event input, such as, for example, events received from personnel (e.g., captured by video cameras used by personnel, or reported by personnel), events received from a surveillance system (e.g., from a network of video cameras deployed in the monitored urban area), or events received from the public (e.g., captured by video cameras used by members of the public, or reported by members of the public), status 152c of events (e.g., "open" for an evolving event or event still monitored or addressed, or "closed" for a past event that requires no further attention). The "Events" section 150a may also include filtering parameters relating to the types of events, such as, for example, municipal 152d events that require the attention of municipal service or services (e.g., water leakage, littering, oil spill, fire, overturned garbage bin, etc.), events 152e relating to people (e.g., rioting, crowding, demonstration, graffiti, illegal gambling, etc.), mobility 152f events (e.g., traffic congestion, vehicle breakdown, traffic accident, illegal parking, etc.), and environmental 152g events (e.g., noise, dumping, flooding, smoke, air quality, etc.).

"Personnel" section 150b may include filtering parameters that relate to forces and services under the disposal of the user (operator), such as, for example, type 154a of personnel units (e.g., police, fire, or ambulance), and identification 154b parameters (e.g., call sign).

"Map" section 150c may include filtering parameters such as type of map data 156a (e.g., weather, traffic, flashlight), type of map view 156b (e.g., two-dimensional or three-dimensional views), and types of available cameras 156c (e.g., pan-tilt-zoom, face recognition, fixed camera, license plate recognition, personnel smartphones or devices, citizens' mobiles, smart glasses etc.).

Figure 11:
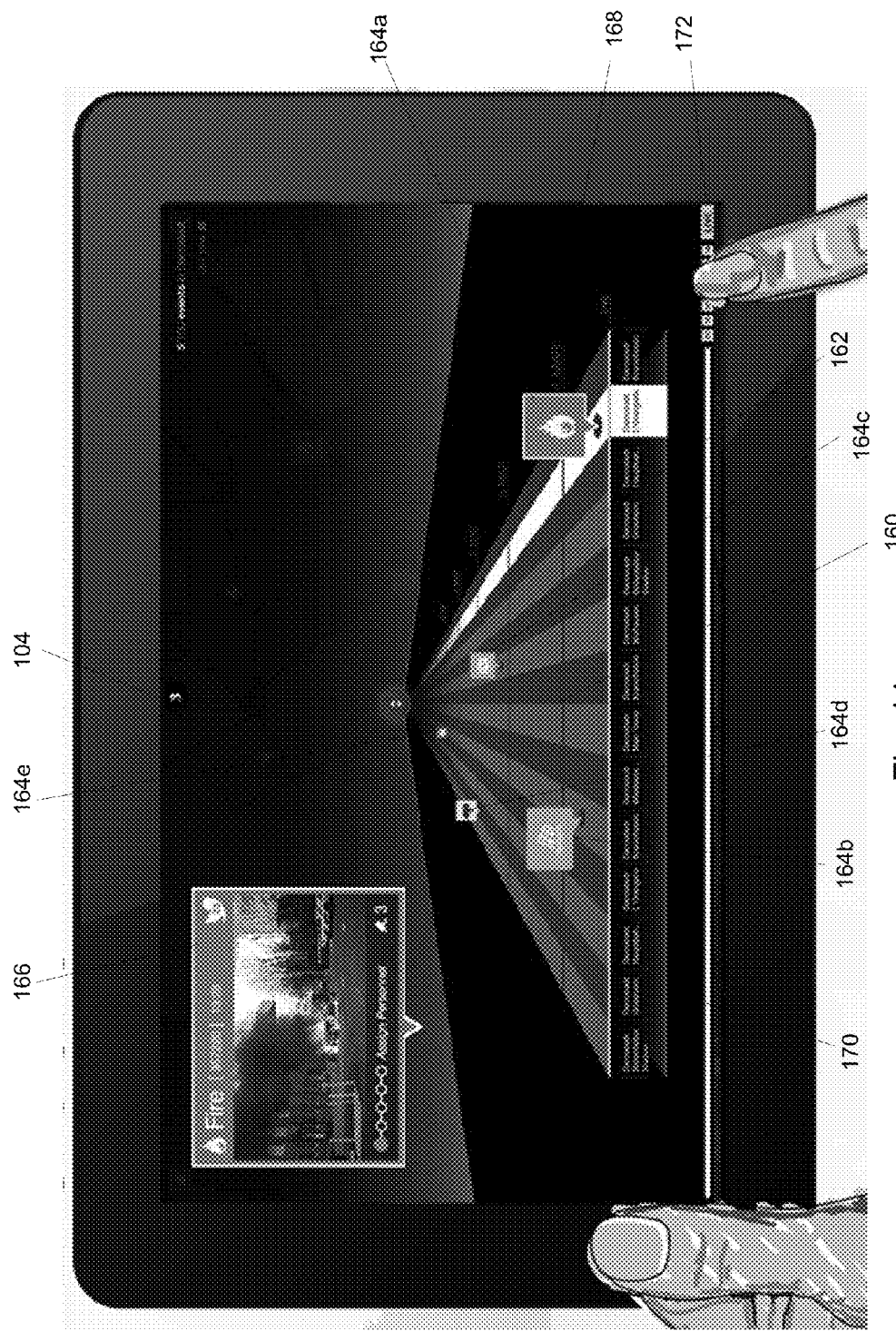
FIG. 11 illustrates a display device displaying a screen presenting events in different parts of an urban area on a timeline, according to some embodiments of the present invention.

FIG. 11 illustrates a display device displaying a screen presenting events in different parts of an urban area on a timeline, according to some embodiments of the present invention. The event timeline 160 may be presented in a three-dimensional perspective, with recent events (e.g., event 164a, followed by a close-by event 164b) appearing in the front and older events (e.g., events 164c, 164d and 164e) appearing in the back. Furthermore, timeline 160 is presented in the form of parallel stripes 162, each stripe relating to a specific camera or detection zone. Scale marks alongside timeline 160 indicate consecutive times (e.g., dates) to allow convenient browsing along the timeline. A selected event 164a may cause highlighting of the entire stripe, and an image or other information frame may be provided (an image 166 of the event in the presented example). Browsing the timeline and accessing different times may be achieved by pointing a target on a time scale 170 presented at the bottom of the screen. This may be done by touching a desired location on the time scale, or sliding along the time scale to the desired time in the past. A button marked "Live" may be used to set the timeline back to the current time.

Figure 12:
FIG. 12 illustrates a display device displaying a screen presenting an event story board of a selected event that has occurred in the visible portion of the urban map shown on the screen, according to some embodiments of the present invention.

FIG. 12 illustrates a display device displaying a screen presenting an event story board of a selected event that has occurred in the visible portion of the urban map shown on the screen, according to some embodiments of the present invention. This screen provides an overview of all aspects related to the event in question whether in progress or already completed. The screen may be split to two sections: one section presenting a section 170 of the urban map with the camera 174 that captured video data of a selected event 176. Video feed containing the captured event is presented in a corresponding frame 172. The other section of the screen may provide information on the event. For example, a chain of events 182 which were linked (e.g., suspect spotted, identified, and tracked within the monitored area), with respect to the selected events, may be presented in one part. Chronological data 184 relating to the event may also be presented. A check list 180 of actions or stages that should be followed may also be presented. Data 186 relating to personnel and other people involved in handling the event may further be presented. 186 presents an communication interface with the related personnel and the ability to determine whether they are already at the location or what their estimated time of arrival (ETA) is.

Figure 13:
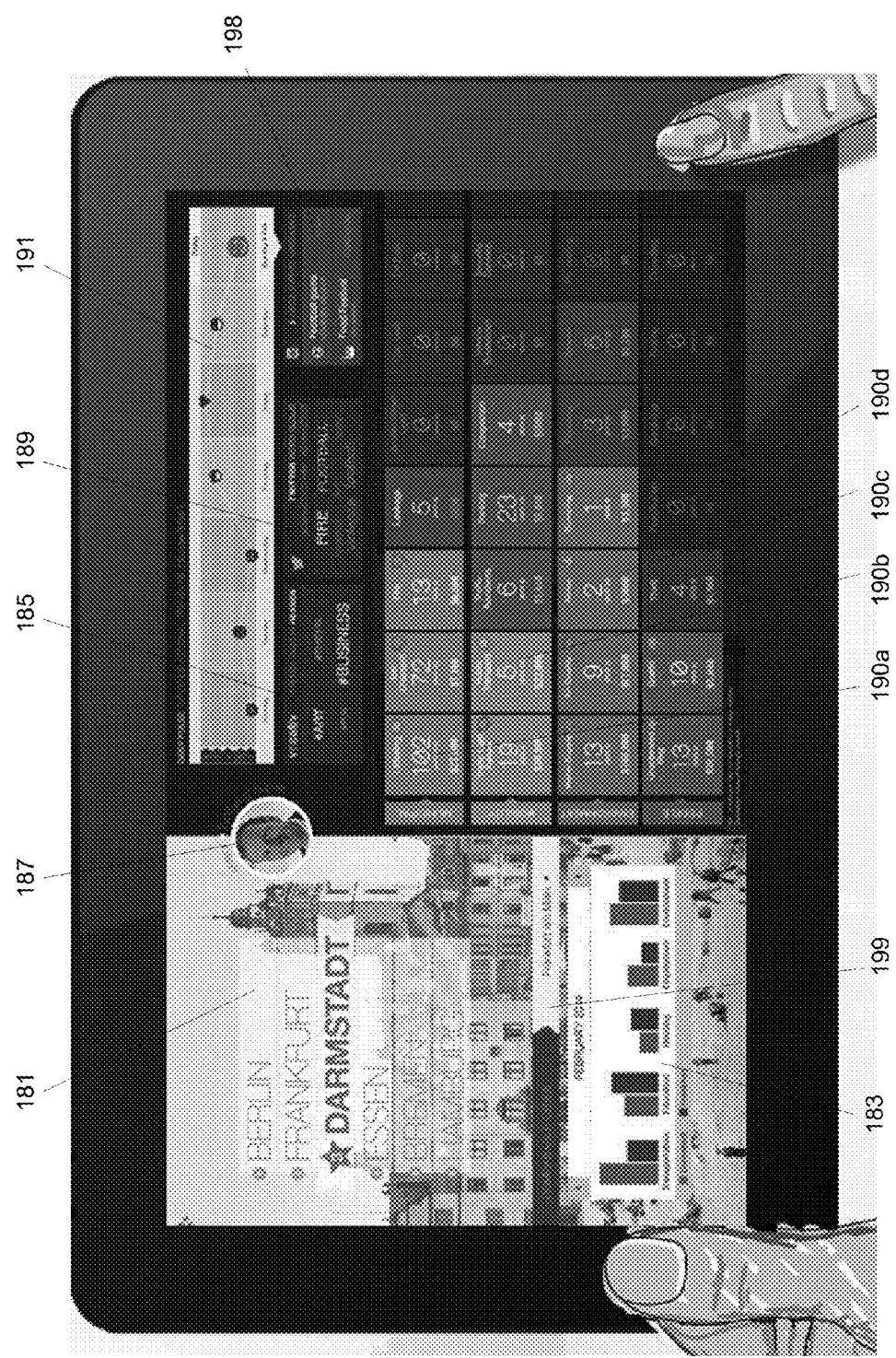
FIG. 13 illustrates a display device displaying a screen presenting status information for a selected urban area, according to some embodiments of the present invention.

FIG. 13 illustrates a display device displaying a screen presenting status information for a selected urban area, according to some embodiments of the present invention.

The status information may relate to one or more monitored urban zones (e.g., different cities). A list 181 of tracked urban zones, from which the user may select an urban zone to present status information relating to that zone. A photograph 187 or other information relating to the mayor or head of municipal authority may be presented. Rows relating to various event types may be presented that have occurred in the course the last day or a specific period of time, for example, row 190*a*, presenting the number of different municipal events that had occurred in the last 24 hours, row 190*b*, presenting the number of different mobility events that had occurred in the last 24 hours, row 190*c*, presenting the number of different environmental events that had occurred in the last 24 hours, and row 190*d*, presenting, the number of different events relating to people (e.g., members of the public) that had occurred in the last 24 hours.

It also shows the average of daily reported events per item, for example, so as to indicate if the reported number of events is above or below normal.

A graph 191 showing the development of the emotional status of the city. This emotional status is derived from analytics of different social feed (tweets/facebook, etc.). The highlights of the social feeds, media may be provided on the screen in various sections 185, 189 and 198.

A comparative view may be generated by selecting another urban zone for comparison from a provided list 199, and comparative data 183 may be presented on the screen.

The user may select to investigate specific event or events. This may be achieved, for example, by selecting "investigations" 147 from menu 142 (see FIG. 9).

Figure 14:
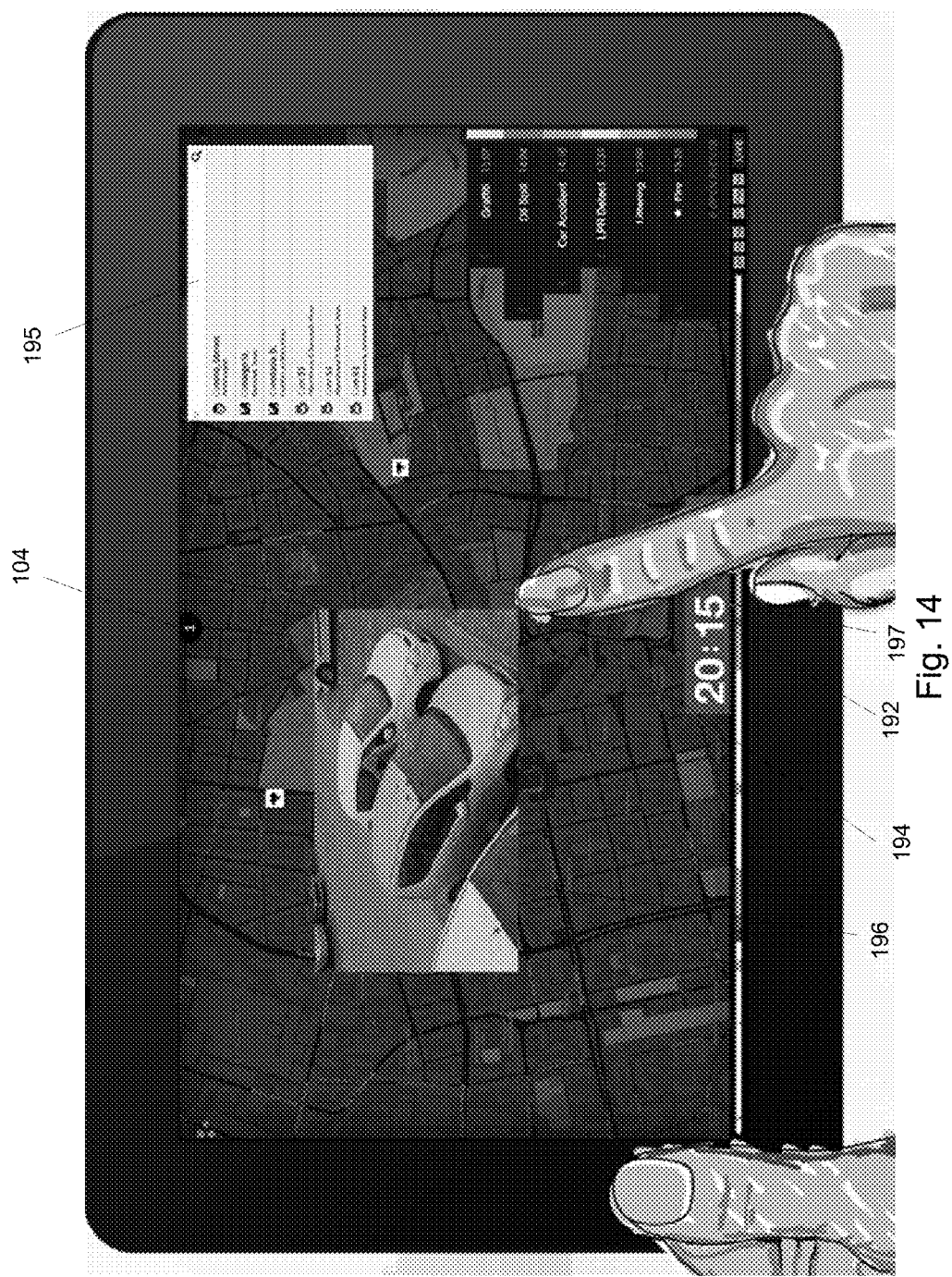
FIG. 14 illustrates a display device displaying a screen presenting investigating an event that had occurred in the past in the visible portion of the urban map shown on the screen, according to some embodiments of the present invention.

FIG. 14 illustrates a display device displaying a screen presenting investigating an event that had occurred in the past in the visible portion of the urban map shown on the screen, according to some embodiments of the present invention. The user may select the event by selecting a monitored zone or location from a list 195, and clicking on timeline 192 or sliding over it to a desired point in time 197. At that point the user may touch the camera of interest 194 and watch the video feed that was captured at that time in a video frame 196

Figure 15:
FIG. 15 illustrates a display device displaying a screen presenting a plurality of frames showing video feed from a preselected group of cameras, according to some embodiments of the present invention, with a timeline for each camera, indicating detected events over a tracking time and their corresponding relation with events for the other cameras.

FIG. 15 illustrates a display device displaying a screen presenting a plurality of frames 202*a*, 202*b*, 202*c*, and 202*d*, showing video feed from a preselected group of cameras, according to some embodiments of the present invention, with a timeline 204 for each camera, indicating detected events 206 over a tracking time and their corresponding relation with events for the other cameras. A selected time 208 may be presented.

Figure 16:
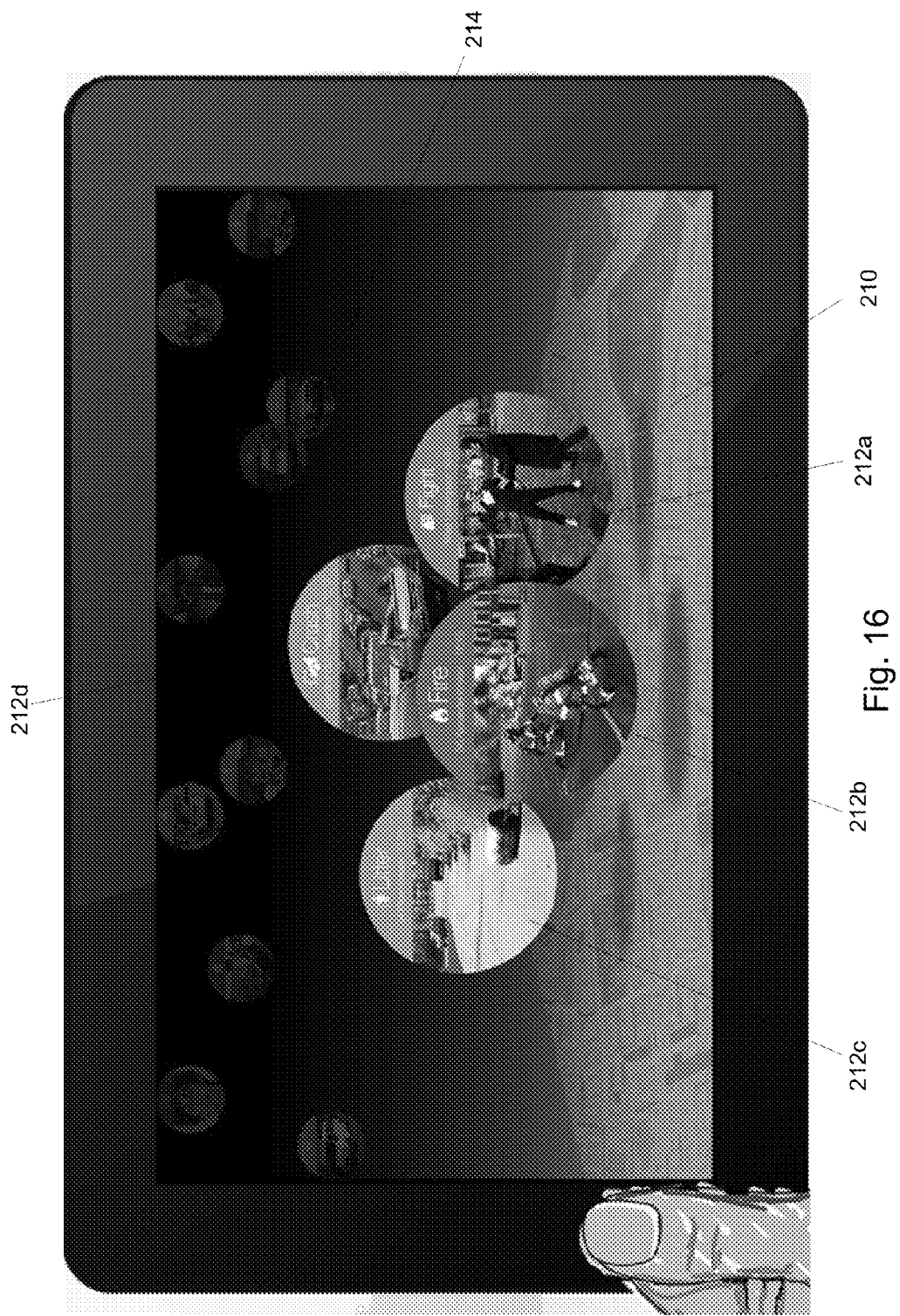
FIG. 16 illustrates a display device displaying a screen saver screen, presenting information on recent events, according to some embodiments of the present invention.

FIG. 16 illustrates a display device displaying, a screensaver screen 210, presenting information on recent events 212*a*, 212*b*, 212*c* and 212*d*, according to some embodiments of the present invention. The user may leave the display device for a certain period of time during which further events may be detected. As the device is left idle for some time, a screensaver application may be activated. In some embodiments the screensaver application may animate the open events in the form of bubbles floating on the screen, wherein the older open events appear as bubbles 214 in the background, whereas newly detected events that were detected after the activation of the screensaver application are presented in the form of bubbles 212*a*, 212*b*, 212*c* and 212*d*, in the front of the screen, so as to catch the attention of the user when the user returns.

Figure 17:
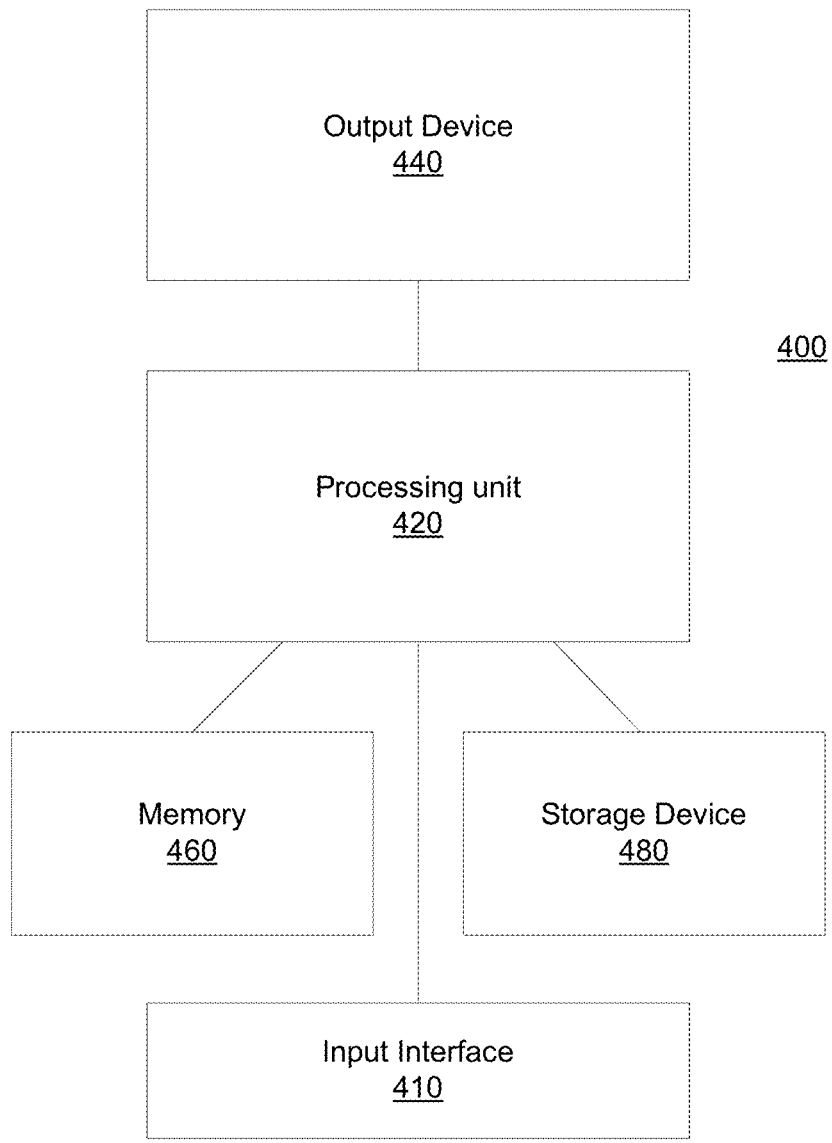
FIG. 17 illustrates a system for display of visual information, according to some embodiments of the present invention.

FIG. 17 illustrates a system 400 for display of visual information, according to some embodiments of the present invention.

System 400 may include a processing unit 420 (e.g. one or a plurality of processors, on a single machine or distributed on a plurality of machines) for executing a method according to some embodiments of the present invention. Processing unit 420 may be linked with memory 460 on which a program implementing a method according to some embodiments of the present invention and corresponding data may be loaded and run from, and storage device 480, which includes a non-transitory computer readable medium (or mediums) such as, for example, one or a plurality of hard disks, flash memory devices, etc. on which a program implementing a method according to some embodiments of the present invention and corresponding data may be stored. System 400 may further include an output device 440 (e.g. display device such as CRT, LCD, LED etc.) on which one or a plurality user interfaces associated with a program implementing a method according to some embodiments and corresponding data may be presented. System 400 may also include input device 410, such as, for example, one or a plurality of keyboards, pointing devices, touch sensitive surfaces (e.g. touch sensitive screens), etc. for allowing a user to input commands and data.

Additional Features

Figure 18:
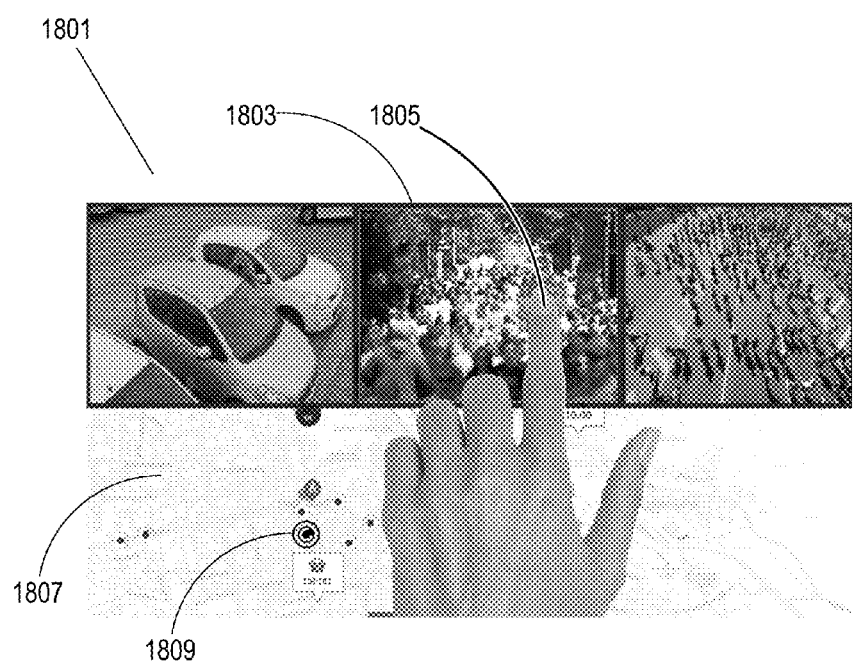
FIG. 18 illustrates displaying a map location of a camera in response to a user query of a video source, according to an embodiment of the present invention.

FIG. 18 illustrates displaying a map location of a camera in response to a user query of the source of a video in a shutter video frame, according to an embodiment of the present invention. A shutter 1801 contains a video frame 1803 for which the user would like to know the camera location on a map 1807. According to the embodiment, the user performs a gesture indicating video frame 1803, such as a tap and hold gesture 1805 on video frame 1803, after which the system identifies a camera location 1809 on map 1807. In a related embodiment, the identification is an animation which modulates the size of the camera icon. In another related embodiment, the identification is a change in the color and/or brightness of the camera icon. In various embodiments, the identification lasts for the duration of the tap and hold. In other embodiments, the identification lasts for a predetermined amount of time.

Figure 19:
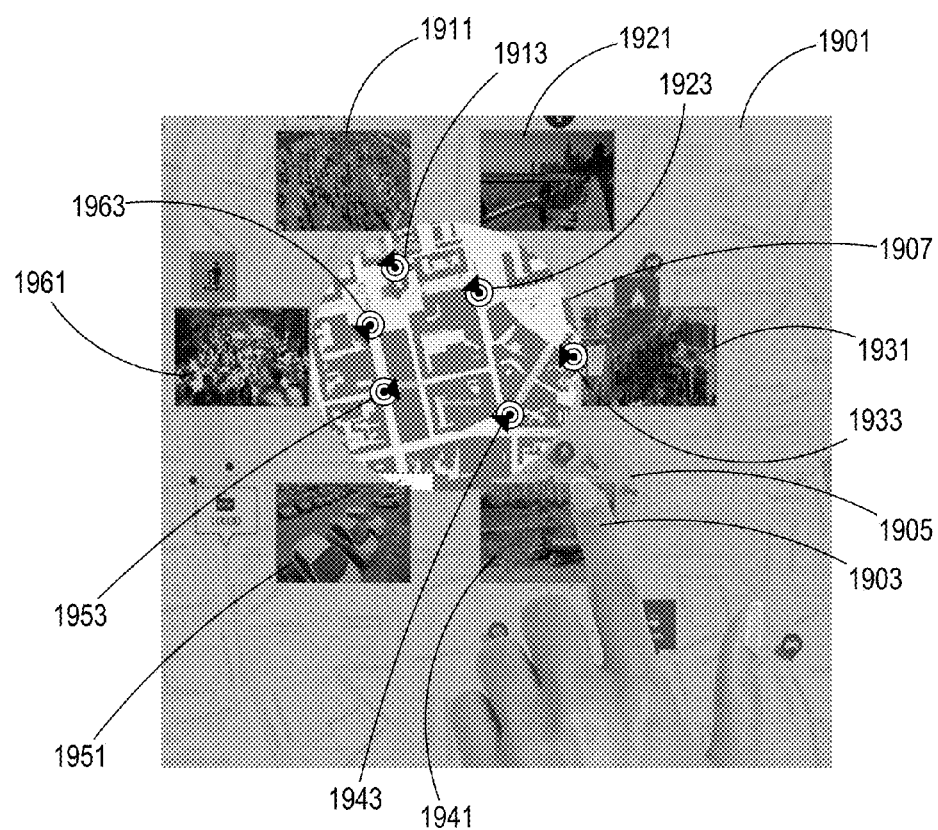
FIG. 19 illustrates a zoom of a map area to display videos captured by cameras in the map area, according to an embodiment of the present invention.

FIG. 19 illustrates a zoom of a map area to display videos information captured by cameras in the map area rather than in the shutter, according to an embodiment of the present invention. A map 1901 has an area of interest 1905, which the user zooms via a gesture 1903, resulting in an enlarged zoom region 1907 and the following elements: a video frame 1911 from a camera 1913; a video frame 1921 from a camera 1923; a video frame 1931 from a camera 1933; a video frame 1941 from a camera 1943; a video frame 1951 from a camera 1953; and a video frame 1961 from a camera 1963.

Figure 20:
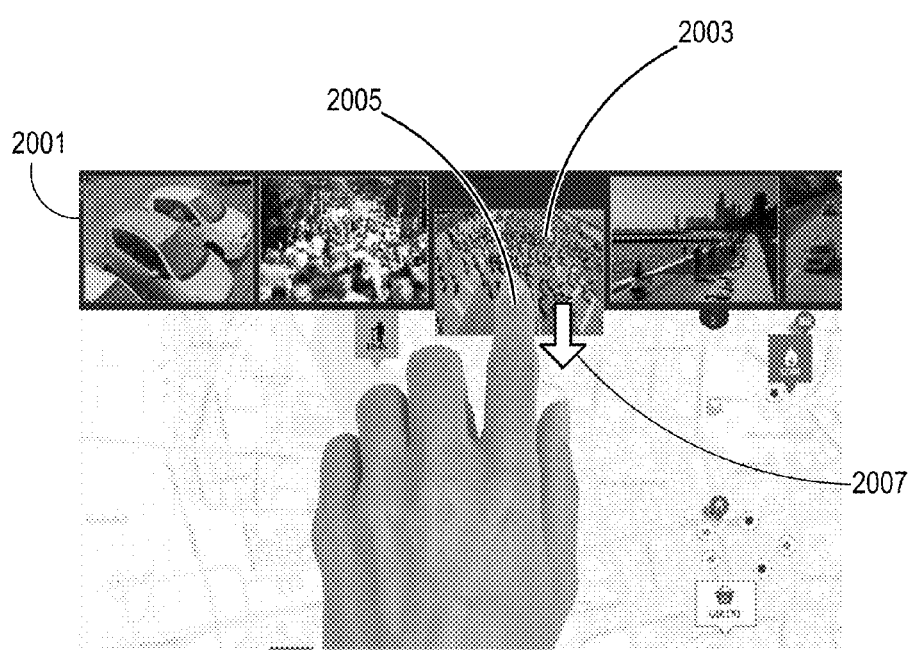
FIG. 20 illustrates removal of a selected video frame from a shutter, according to an embodiment of the present invention.

FIG. 20 illustrates removal of a selected video frame 2003 from a shutter 2001, according to an embodiment of the present invention. The user performs a tap and drag gesture 2005 in a direction 2007, and video frame 2003 is removed.

Some embodiments of the present invention may be embodied in the form of a system, a method or a computer program product. Similarly, some embodiments may be embodied as hardware, software or a combination of both. Some embodiments may be embodied as a computer program product (software application) saved on one or more non-transitory computer readable medium (or media) in the form of computer readable program code embodied thereon. Such non-transitory computer readable medium may include instructions that when executed cause a processor to execute method steps in accordance with examples. In some examples the instructions stores on the computer readable medium may be in the form of an installed application and in the form of an installation package.

Such instructions may be, for example, loaded by one or more processors and get executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

Some embodiments are described hereinabove with reference to flowcharts and/or block diagrams depicting methods, systems and computer program products according to various embodiments.

Features of various embodiments discussed herein may be used with other embodiments discussed herein. The foregoing description of the embodiments has been presented for the purposes of illustration and description. It is not intended to be exhaustive or limiting to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes that fall within the true spirit of the present invention.

What is claimed is:

1. A method for displaying a map location of a camera providing video information, the method comprising:
    causing presentation on a screen of a display device of a map of a monitored area to indicate a number of acquisition devices located in the monitored area by a video camera counter, wherein at least part of the acquisition devices located in the monitored area are not indicated on the screen;
    receiving via an input device a command to display visual information acquired by the acquisition devices; and
    causing the map on the screen to be partially replaced by a video shutter comprising frames amounting to the number of acquisition devices, a frame of the frames present the visual information acquired by one of the acquisition devices;
    performing a gesture indicating a video frame containing the video information; and
    identifying a location of an acquisition device of the acquisition devices on the map, wherein the location of the acquisition device corresponds to a source of the video information.

2. The method of claim 1, wherein the acquisition device comprises a camera, the method further comprising:
    performing a gesture to provide an identification of a camera icon.

3. The method of claim 2, wherein the gesture comprises a tap and hold gesture on the video frame to cause the identification to last for the duration of the tap and hold.

4. The method of claim 2, wherein the gesture comprises a tap and hold gesture on the video frame to cause the identification to last a predetermined amount of time.

5. A method for zooming a map area to display video information captured by one or more cameras in the map area, the method comprising:
    zooming into the map area to present an enlarged area map in which a number of video cameras is below a threshold which causes one or more icons representing one or more video cameras to appear on the enlarged map area; and
    causing video information from the one or more cameras to be displayed in one or more frames adjacent to the enlarged map area, a frame of the one or more frame is configured to display video information captured by a corresponding camera of the one or more cameras in the enlarged map area.

6. The method of claim 5, wherein the frame of the one or more frames is adjacent to the corresponding camera of the one or more cameras in the map area.

7. A method for removing a selected video frame from a video shutter, the method comprising:
    causing presentation on a screen of a display device of a map of a monitored area a video camera counter to indicate a number of one or more cameras located in the monitored area, wherein at least part of the cameras located in the monitored area are not indicated on the screen;
    receiving via an input device a command to display visual information acquired by one or more cameras;
    causing the map on the screen to be partially replaced by a video shutter comprising one or more frames amounting to the number at the video camera counter to present the visual information acquired by the one or more cameras;
    performing a gesture indicating a video frame containing the video information; and
    removing the video frame from the video shutter according to the gesture.

8. The method of claim 7, wherein the gesture includes a tap and a drag in a determined direction.

* * * * *

UNITED STATES PATENT AND TRADEMARK OFFICE
CERTIFICATE OF CORRECTION

| | | |
|---|---|---|
| PATENT NO. | : 9,996,237 B2 | Page 1 of 1 |
| APPLICATION NO. | : 14/709513 | |
| DATED | : June 12, 2018 | |
| INVENTOR(S) | : Eva-Maria Van Dijkman et al. | |

It is certified that error appears in the above-identified patent and that said Letters Patent is hereby corrected as shown below:

On the Title Page

Delete the entire data at Item "(72) Inventors", and insert as follows:
--Eva-Maria Van Dijkman, Frankfurt (DE);
Maria Paula Mariani, Barcelona (ES);
Elizabeth Parham, Kenilworth, Warkshire (GB)--.

Signed and Sealed this
Twenty-first Day of August, 2018

Andrei Iancu
*Director of the United States Patent and Trademark Office*